United States Patent Office 3,039,226
Patented June 19, 1962

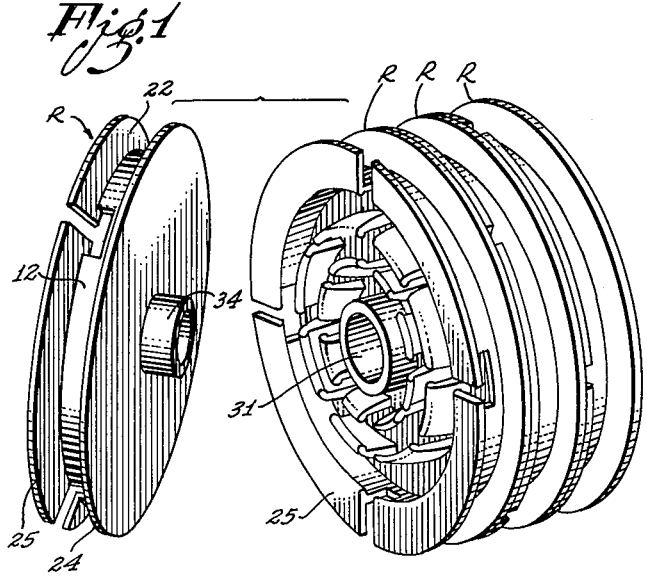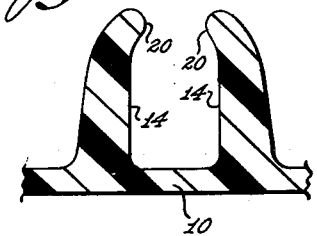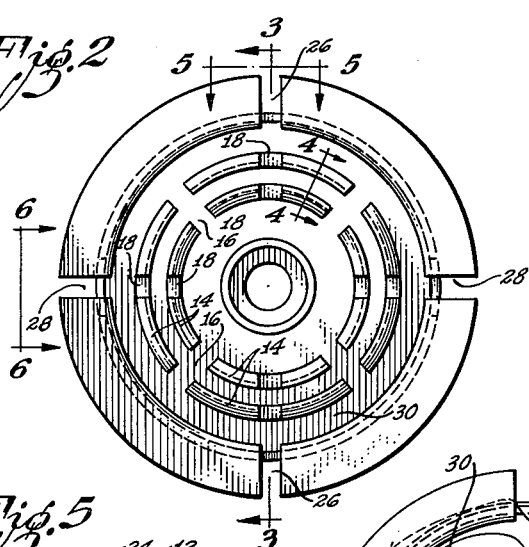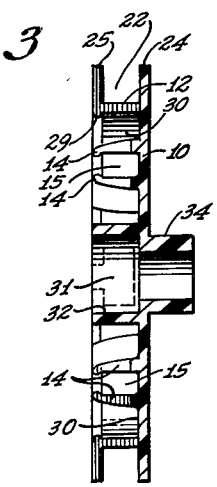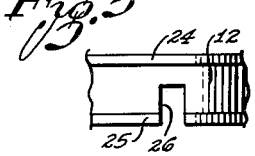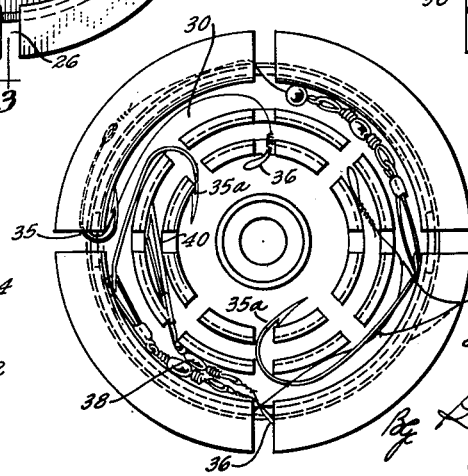
INVENTOR
Anthony J. Bagdonas
Attorneys

3,039,226
FISHING TACKLE CONTAINER
Anthony J. Bagdonas, 6369 W. 82nd St.,
Los Angeles 45, Calif.
Filed Feb. 24, 1959, Ser. No. 794,993
2 Claims. (Cl. 43—57.5)

This invention relates to receptacles for fishing tackle in the form of fish hooks and leaders attached thereto.

The invention is characterized by the concept of employing non-corrosive receptacle units which may be used singly if desired but which, preferably, are releasably interconnected to form a composite receptacle. One advantage of this modular construction is that any number of the receptacle units may be combined to provide a composite receptacle of any desired capacity. Moreover, an owner of such a composite receptacle may increase its capacity by purchasing additional receptacle units. Another advantage of the preferred embodiment of the invention is that each of the units may be a simple one-piece molded body of relatively low cost. Another advantage is that the receptacle units may comprise shallow open-top containers which releasably stack together so that the bottom of one unit closes the open top of an adjacent unit.

In the preferred practice of the invention, each receptacle unit is a circular one-piece body of suitable plastic material, for example nylon, the plastic body being in the form of a container with a bottom wall and a peripheral wall. The bottom wall is provided on its inner side with integral projections which form channels to receive and grip portions of fishing tackle. The pattern of the projections also forms radial spaces to permit leaders of the gripped fishing tackle to extend outward to the peripheral wall and through apertures in the peripheral wall to the outer circumference of the receptacle. The outer circumference is provided with spaced radial flanges forming an outer circumferential groove which serves as a spool on which the fishing tackle leaders may be wound. By virtue of this construction, fishing tackle comprising one or more hooks and one or more corresponding leaders may be stored with at least a portion of the fishing tackle inside the receptacle and with most of the leader or leaders wound around the outer circumference of the receptacle.

Fishing tackle is effectively retained in such a receptacle unit even when the receptacle unit is open at the top. In the first place, the projections on the inner face of the bottom wall are resilient and are shaped and dimensioned to resiliently engage portions of the fishing tackle. In the second place, the pairs of projections that form the channels in the receptacle unit are convergent at their outer ends so that the channels have overhanging walls for more effective grip on the fishing tackle. In the third place, the channels formed by the pairs of projections are arcuate so that straight portions of the fishing tackle, for example straight metal links incorporated therein, distort the walls of the channels by flexure with the consequence that the straight portions are effectively gripped by the channel walls. In the fourth place, in the preferred practice of the invention, the peripheral wall of the receptacle overhangs the interior of the receptacle unit to tend to retain fishing tackle therein.

An important feature of the preferred practice of the invention is that the fishing tackle in a receptacle may be flushed with clean water without removal of the fishing tackle from the receptacle unit. This feature of the invention is made possible by the fact that a receptacle unit is made of non-corrosive material and by the further fact that the receptacle unit is so constructed as to hold the fishing tackle firmly in place. After fishing tackle has been used in salt water, for example, and then returned to the composite receptacle, it is a simple matter to separate the individual receptacle units and to hold each open receptacle unit under running water or to swish it in a body of water for complete removal of salt water and contamination.

The features and advantages of the invention may be understood from the following detailed description considered with the accompanying drawing.

In the drawing, which is to be regarded as merely illustrative:

FIG. 1 is a perspective view of a composite fishing tackle receptacle comprising a stack of individual receptacle units, one receptacle unit being shown as separated from the stack;

FIG. 2 is a plan view of one of the receptacle units;

FIG. 3 is a diametrical section taken as indicated by the line 3—3 of FIG. 2;

FIG. 4 is a greatly enlarged radial section taken as indicated by the line 4—4 of FIG. 2 and showing the cross-sectional configuration of a channel formed by a pair of the projections on the inner side of the bottom wall of the receptacle unit;

FIG. 5 is a fragmentary side elevation as seen along the line 5—5 of FIG. 2 showing a slot in the flanged peripheral wall of the receptacle unit;

FIG. 6 is a similar side elevational view as seen along the line 6—6 of FIG. 2 showing the configuration of a second slot in the flanged peripheral wall; and FIG. 7 is a view similar to FIG. 2 showing fishing tackle stored in a receptacle unit.

FIG. 1 shows by way of example a composite container comprising a stack of four individual receptacle units, each receptacle unit being generally indicated by the letter R. An end receptacle unit is shown separated from the stack and exposing the interior of the adjacent receptacle unit. The receptacle units R may be made of any suitable material but nylon is presently preferred and especially so since it has a degree of resiliency that is desirable for the purpose of the invention.

Each of the receptacle units R is of shallow open-top construction and preferably is molded in one piece. As best shown in FIG. 3, each receptacle unit R has a bottom wall 10, a peripheral wall 12 and a plurality of arcuate projections 14 on the inner side of the bottom wall. The projections 14 are paired to form short arcuate channels 15 which are separated by radial spaces 16. In addition, each of the pairs of arcuate projections 14 has a pair of radially aligned recesses 18. As may be seen in FIGS. 3 and 4, each pair of arcuate projections 14 is outwardly convergent to form a pair of lips 20 that overhang the channel 15 formed by the projections.

Each receptacle unit R may be provided with outer flanges to form an outer circumferential groove 22. For this purpose, the bottom wall 10 is extended radially beyond the peripheral wall 12 to form a circumferential flange 24 and the peripheral wall 12 is formed with a corresponding integral flange 25. Thus the two flanges 24 and 25, together with the intervening peripheral wall 12, form a spool on which leaders of fishing tackle may be wound. This flanged spool structure is suitably apertured to permit the leaders to pass from the interior of the receptacle unit to the exterior of the peripheral wall 12.

In this particular embodiment of the invention, a pair of diametrically opposite apertures or slots 26 are formed in the peripheral wall 12 and the adjacent flange 25, as best shown in FIGS. 2 and 5. Each of these slots is in radial alignment with a pair of the previously mentioned recesses 18 in the projections 14. A second diametrical pair of apertures or slots 28 at 90° from the slots 26 may also be provided in the flange 25 and peripheral wall 12, as shown in FIGS. 2 and 6. As shown in FIG. 6, the slots 28 have relatively narrow entrances through the flanges 25. As may be seen in FIG. 2, the two slots 28 are also in radial alignment with pairs of recesses 18 in the projections 14.

Preferably the peripheral wall 12 at least overhangs the interior of the receptacle unit to tend to retain fishing tackle in the unit. For this purpose, the peripheral wall 12 may be formed with an inner circumferential lip 29 as shown in FIG. 3. The peripheral wall 12 together with the adjacent arcuate projections 14 form an inner circumferential channel 30 which, like the channels 15, may releasably retain portions of fishing tackle. The lip 29 increases the effectiveness of the inner circumferential channel for this purpose.

The receptacle units R are adapted to be releasably connected together in any suitable manner to form a composite receptacle such as the composite receptacle shown in FIG. 1. For this purpose, each of the receptacle units R may be formed with a suitable socket means extending in one axial direction and a suitable plug means extending in the opposite axial direction so that an assembly of the receptacle units may be held together by engagement of the socket means and plug means of successive receptacle units. As best shown in FIGS. 1 and 3, a concentric socket 31 may be formed by a circular flange 32 that extends inward from the bottom wall 10 and a complementary concentric hollow plug 34 may be formed by a tubular extension in the opposite axial direction from the bottom wall. It is apparent that any desired number of the receptacle units R may be releasably interconnected in stacked relation simply by engagement of the plugs 34 with the sockets 31.

FIG. 7 shows by way of example how a fish hook 35 attached to a leader 36 may be retained in a receptacle unit by hook engagement with one of the apertures 28 in the peripheral wall 12. The leader 36 to which the hook 35 is attached is wound in the outer circumferential groove 22 and then enters the interior of the receptacle unit through the second opposite aperture 28. A small weight 38 that is linked to the leader 36 is wedged into an arcuate channel 15 formed by a pair of projections 14. At the end of the leader, a straight link in the form of a wire loop 40 is forced into an arcuate channel 15 with resulting distortion of the channel walls and consequent effective retention of the link. FIG. 7 further illustrates how fishing tackle may be stored with the fish hooks 35a inside the receptacle unit.

My description in specific detail of the selected embodiment of the invention will suggest various changes, substitutions and other departures from my disclosure within the spirit and scope of the appended claims.

I claim:
1. In a fishing tackle container, an open-top one-piece shallow receptacle unit of plastic material having a bottom wall, a peripheral wall and a plurality of projections on the inner side of said bottom wall for engagement with portions of fishing tackle, said peripheral wall being formed with a pair of spaced peripheral flanges whereby the peripheral wall and the two flanges form a spool to be wound by fishing tackle leaders, there being at least one slot in said peripheral wall and one of said flanges thereof to permit fishing tackle to extend therethrough, said projections forming spaced channels to receive portions of fishing tackle, said receptacle unit being made of resilient material for the walls of said channels to yieldingly grip portions of fishing tackle, said receptacle unit being formed with a socket for frictional engagement with an adjoining receptacle unit whereby a plurality of the receptacle units may be stacked in releasable engagement with each other to form a composite receptacle with the bottom wall of one receptacle unit closing the open top of an adjacent receptacle unit.

2. In a fishing tackle container, an open-top one-piece shallow receptacle unit having a bottom wall, a peripheral wall with at least one aperture therein, a plurality of projections on the inner side of said bottom wall, and a pair of spaced peripheral flanges forming with said peripheral wall an open outer circumferential groove to serve as a spool for leaders of the fishing tackle, said receptacle unit being made of resilient material and at least some of said projections being paired to cooperate in the formation of channels between the paired projections to yieldingly grip portions of fishing tackle, said pairs of projections being convergent at their outer ends to retain said portions, said bottom wall being formed with a socket element on one of its two sides and being formed with a complementary plug element on its other side whereby a series of the receptacle units may be assembled in a stack with the bottom of one receptacle unit closing the open top of an adjacent receptacle unit and with the receptacle units frictionally held together by engagement of plug elements and socket elements of the successive receptacle units.

References Cited in the file of this patent
UNITED STATES PATENTS

| | | |
|---|---|---|
| 391,540 | Leonard | Oct. 23, 1888 |
| 2,559,780 | Martinson | July 10, 1951 |
| 2,763,957 | Roberts | Sept. 25, 1956 |
| 2,781,986 | Bixby | Feb. 19, 1957 |